United States Patent
Jiang et al.

(10) Patent No.: US 9,238,460 B1
(45) Date of Patent: Jan. 19, 2016

(54) SYSTEMS FOR MANAGING DOWNSHIFTS IN HYBRID-ELECTRIC VEHICLES

(71) Applicants: Toyota Motor Corporation, Toyota (JP); Ford Global Technologies, LLC, Dearborn, MI (US)

(72) Inventors: Hong Jiang, Canton, MI (US); Roger Lyle Huffmaster, Canton, MI (US); Marvin Paul Kraska, Dearborn, MI (US); Bernard D. Nefcy, Novi, MI (US); Seiji Kuwahara, Toyota (JP)

(73) Assignees: TOYOTA MOTOR CORPORATION (JP); FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/338,687

(22) Filed: Jul. 23, 2014

(51) Int. Cl.
*B60L 9/00* (2006.01)
*B60W 20/00* (2006.01)
*B60W 30/19* (2012.01)
*F16H 61/16* (2006.01)
*B60W 10/06* (2006.01)
*B60W 10/115* (2012.01)

(52) U.S. Cl.
CPC ............ *B60W 20/108* (2013.01); *B60W 10/06* (2013.01); *B60W 10/115* (2013.01); *B60W 30/19* (2013.01); *F16H 61/16* (2013.01); *F16H 2061/163* (2013.01); *Y10S 903/93* (2013.01)

(58) Field of Classification Search
CPC ..... B60W 20/00; B60W 10/08; F16H 61/688; F16H 2061/0024
See application file for complete search history.

(56) References Cited

U.S. PATENT DOCUMENTS

| | | | |
|---|---|---|---|
| 6,077,186 A | 6/2000 | Kojima et al. | |
| 6,364,807 B1 | 4/2002 | Koneda et al. | |
| 7,179,195 B2 | 2/2007 | Joe | |
| 7,264,572 B2 | 9/2007 | Jeon | |
| 7,815,544 B2 | 10/2010 | Jeon | |
| 2008/0182722 A1 | 7/2008 | Colvin et al. | |
| 2012/0265382 A1 | 10/2012 | Nefey et al. | |
| 2013/0012353 A1 | 1/2013 | Yoshida et al. | |

*Primary Examiner* — Michael D Lang
(74) *Attorney, Agent, or Firm* — Dinsmore & Shohl LLP

(57) ABSTRACT

Systems for managing downshifts in hybrid-electric vehicles are disclosed. The systems include a multispeed transmission, an internal combustion engine selectively coupled to the multispeed transmission, an electric motor coupled to the multispeed transmission, and an electronic control unit. The electronic control unit is programmed to evaluate a torque demand, start the internal combustion engine, and pre-stage a downshift shift sequence by partially disengaging a second shift clutch and partially engaging a first shift clutch. The electronic control unit is also programmed to interrupt the downshift shift sequence until a pre-determined torque supplemental event occurs and later complete the downshift shift sequence by modifying the hydraulic pressure through the valve body to completely disengage a second gear set from the input shaft with the second shift clutch and completely engage a first gear set and the input shaft with the first shift clutch.

20 Claims, 6 Drawing Sheets

SYSTEMS FOR MANAGING DOWNSHIFTS IN HYBRID-ELECTRIC VEHICLES

TECHNICAL FIELD

The present specification generally relates to systems for managing downshifts in hybrid-electric vehicles and, more particularly, systems for interrupting downshifts of transmissions in hybrid-electric vehicles.

BACKGROUND

Hybrid-electric vehicles that include an internal combustion engine and an electric motor/generator operate in a variety of operating modes including an electric operating mode, a combustion operating mode, and a combustion/electric operating mode. In general, as torque demand from the driver of the hybrid-electric vehicle increases, the hybrid-electric vehicle may switch from an electric operating mode to a combustion/electric operating mode or to a combustion operating mode. Additionally, an elevated torque demand from the driver may initiate a downshift of the transmission so that the internal combustion engine and/or the electric motor/generator can provide requested torque to the drive wheels of the hybrid-electric vehicle. Transitioning between operating modes may be complicated by driver torque demand, vehicle operating speed, and vehicle operating condition.

Accordingly, systems for managing downshifts in hybrid-electric vehicles may be desired.

SUMMARY

In one embodiment, a system for managing downshifts in a hybrid-electric vehicle includes a multispeed transmission having an input shaft, a first gear set, a first shift clutch that selectively couples the first gear set with the input shaft, a second gear set, a second shift clutch that selectively couples the second gear set to the input shaft, and a valve body that controls a hydraulic pressure applied to the first shift clutch and the second shift clutch to selectively engage the first shift clutch and the second shift clutch. The system also includes an internal combustion engine selectively coupled to the input shaft of the multispeed transmission, an electric motor coupled to the input shaft of the multispeed transmission, and an electronic control unit. The electronic control unit is programmed to evaluate a torque demand, start the internal combustion engine, and pre-stage a downshift shift sequence by modifying the hydraulic pressure through the valve body to partially disengage the second shift clutch and partially engage the first shift clutch. The electronic control unit is also programmed to interrupt the downshift shift sequence until a pre-determined torque supplemental event occurs and complete the downshift shift sequence by modifying the hydraulic pressure through the valve body to completely disengage the second gear set from the input shaft with the second shift clutch and completely engage the first gear set and the input shaft with the first shift clutch.

In another embodiment, a system for managing downshifts in a hybrid-electric vehicle includes a multispeed transmission having an input shaft, a first gear set, a first shift clutch that selectively couples the first gear set with the input shaft, a second gear set, a second shift clutch that selectively couples the second gear set to the input shaft, and a valve body that controls a hydraulic pressure applied to the first shift clutch and the second shift clutch to selectively engage the first shift clutch and the second shift clutch. The system also includes an internal combustion engine selectively coupled to the input shaft of the multispeed transmission, an electric motor coupled to the input shaft of the multispeed transmission, and an electronic control unit. The electronic control unit is programmed to initiate a downshift shift sequence of the multispeed transmission, initiate a pressure delay in the downshift shift sequence by interrupting the downshift shift sequence and maintain pressure to partially disengage the second shift clutch and partially engage the first shift clutch, maintain the pressure delay until a pre-determined torque supplemental event occurs, and complete the downshift shift sequence by completely disengaging the second gear set from the input shaft with the second shift clutch and completely engaging the first gear set and the input shaft with the first shift clutch.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of systems for managing downshifts for hybrid-electric vehicles. The systems include a multispeed transmission having hydraulically-operated clutches that selectively engage gear sets with an input shaft, an internal combustion engine selectively coupled to the input shaft of the multispeed transmission, and an electric motor coupled to the input shaft of the multispeed transmission. The systems further include an electronic control unit that is in electronic communication with the electric motor, components of the internal combustion engine, and a valve body of the multispeed transmission that directs hydraulic fluid within the multispeed transmission to effect shifts between the plurality of gear sets. When the hybrid-electric vehicle is operating in an electric operating mode and the driver demands increased torque, the electronic control unit evaluates the torque demand and determines if the electric motor has sufficient additional torque output capacity to satisfy the driver's torque demand. If the electric motor cannot satisfy the torque demand, the electronic control unit starts the internal combustion engine and pre-stages a downshift shift sequence by modifying the hydraulic pressure in the valve body to partially disengage a second shift clutch and partially engage a first shift clutch. The electronic control unit interrupts the downshift shift sequence, maintaining partial engagement of the first and second shift clutches until a pre-determined torque supplement event occurs, for example, the internal combustion engine producing a pre-determined amount of torque or after a pre-determined amount of time. After the pre-determined torque supplement event occurs, the electronic control unit completes the downshift shift sequence by modifying the hydraulic pressure in the valve body to completely disengage the second gear set from the input shaft with the second clutch and completely engage the first gear set and the input shaft with the first clutch. Various embodiments of systems for managing downshifts in hybrid-electric vehicles will be described in more detail herein.

Figure 1:
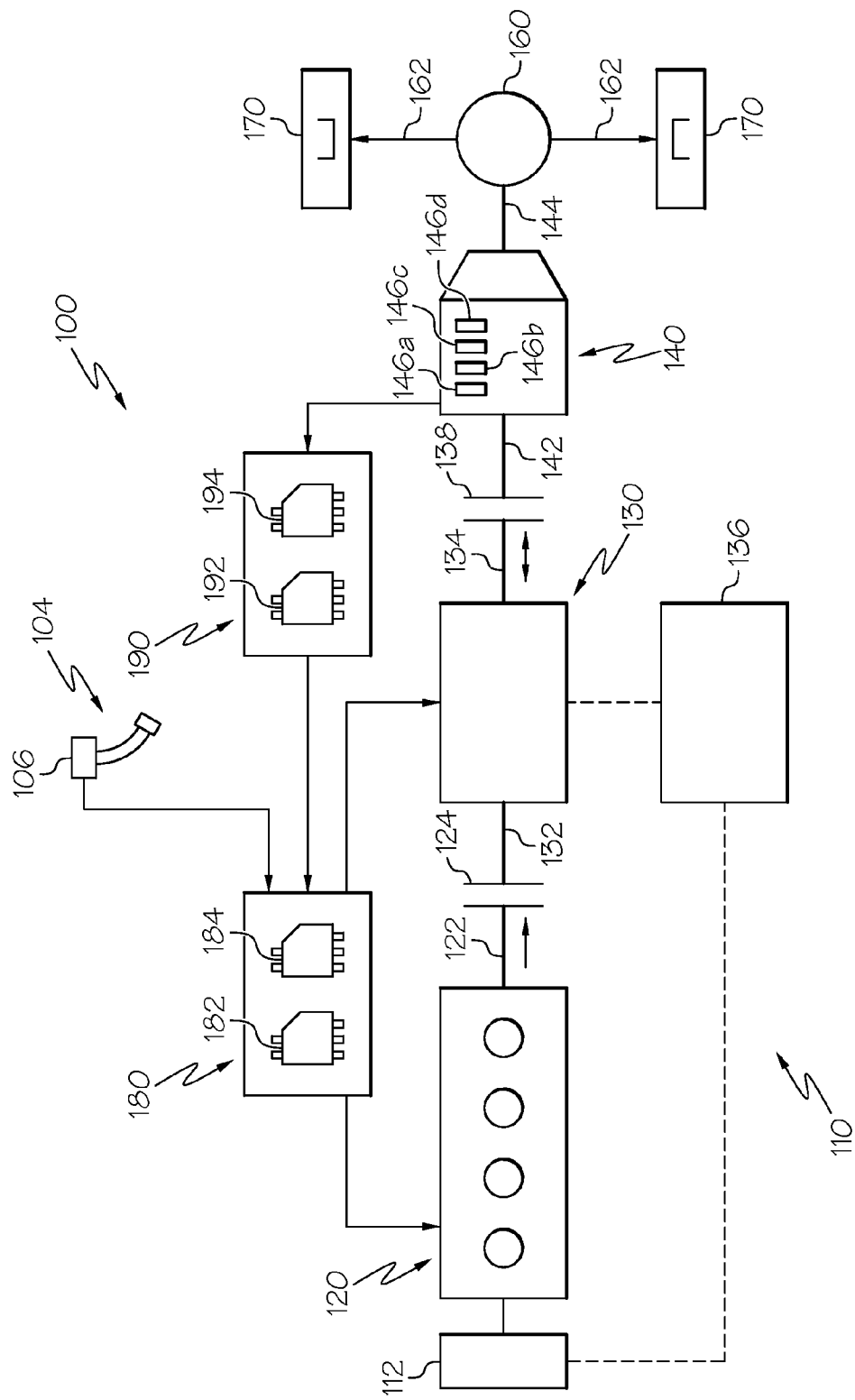
FIG. 1 schematically depicts a powertrain system for a hybrid-electric vehicle having modular hybrid technology according to one or more embodiments shown or described herein.

Referring now to FIG. 1, one embodiment of a powertrain 110 for a hybrid-electric vehicle 100 that incorporates modular hybrid technology (MHT). The hybrid-electric vehicle 100 having MHT includes an internal combustion engine 120 having an output shaft 122 that is coupled to an input shaft 132 of an electric motor 130 through an engine clutch 124. In some embodiments, the internal combustion engine 120 is also coupled to an electric starter motor 112 that is electrically coupled to a battery 136.

The electric motor 130 of the hybrid-electric vehicle 100 includes an output shaft 134 that is coupled to the rotor of the electric motor 130. The output shaft 134 of the electric motor 130 is selectively coupled to an input shaft 142 of a multispeed transmission 140 by a motor clutch 138. The motor clutch 138 provides selective coupling of the output shaft 134 of the electric motor 130 to the input shaft 142 of the multispeed transmission 140. The electric motor 130 is also coupled to the battery 136. In some embodiments, the battery 136 to which the electric motor 130 is coupled is different than the battery 136 to which additional electrical components of the hybrid-electric vehicle 100 are coupled, so that hybrid-electric vehicle 100 can operate electrical components at a variety of voltages.

The multispeed transmission 140 includes a plurality of selectable gear sets 146a, 146b, 146c, 146d, which may be engaged or disengaged to modify the relative rates of rotation of the input shaft 142 and an output shaft 144 of the multispeed transmission 140, as will be described in greater detail below. The output shaft 144 of the multispeed transmission 140 may be mated to a differential 160 that directs torque from the multispeed transmission 140 to drive wheels 170 through axles 162. In some embodiments, components of the multispeed transmission 140, the output shaft 144, the differential 160 and the mating elements of the axles 162 may be incorporated into a transaxle (not shown).

The hybrid-electric vehicle 100 may be operated in a variety of operating modes including operating in an electric operating mode in which torque is provided to the input shaft 142 of the multispeed transmission 140 by the electric motor 130, in a combustion operating mode in which torque is provided to the input shaft 142 of the multispeed transmission 140 by the internal combustion engine 120, or in a mixed electric/combustion operating mode in which torque is provided to the input shaft 142 of the multispeed transmission 140 by both the internal combustion engine 120 and the electric motor 130. In some operating modes, for example when the hybrid-electric vehicle 100 is operated in a combustion operating mode, operation of the electric motor 130 may be modified so that the electric motor 130 extracts energy from the output shaft 122 of the internal combustion engine 120 and generates electrical power, which is directed to the battery 136 for storage.

The internal combustion engine 120, the electric motor 130, and the multispeed transmission 140 are in electronic communication with an electronic control unit 180. The electronic control unit 180 includes a computer processor 182 and a non-transitory memory 184 in which a computer readable instruction set is stored. When the computer readable instruction set is executed by the computer processor 182, the electronic control unit 180 transmits and receives signals to and from the internal combustion engine 120, the electric motor 130, and the multispeed transmission 140 to control operation of the powertrain components.

In some embodiments, the hybrid-electric vehicle 100 may also include a transmission controller 190 that is in electronic communication with the electronic control unit 180. In these embodiments, the transmission controller 190 controls operation of the multispeed transmission 140. The transmission controller 190 has a computer processor 192 and a non-transitory memory 194. A computer readable instruction set stored in the non-transitory memory 194 of the transmission controller 190 is executed by the computer processor 192 and controls operation of the components of the multispeed transmission 140.

Figure 2:
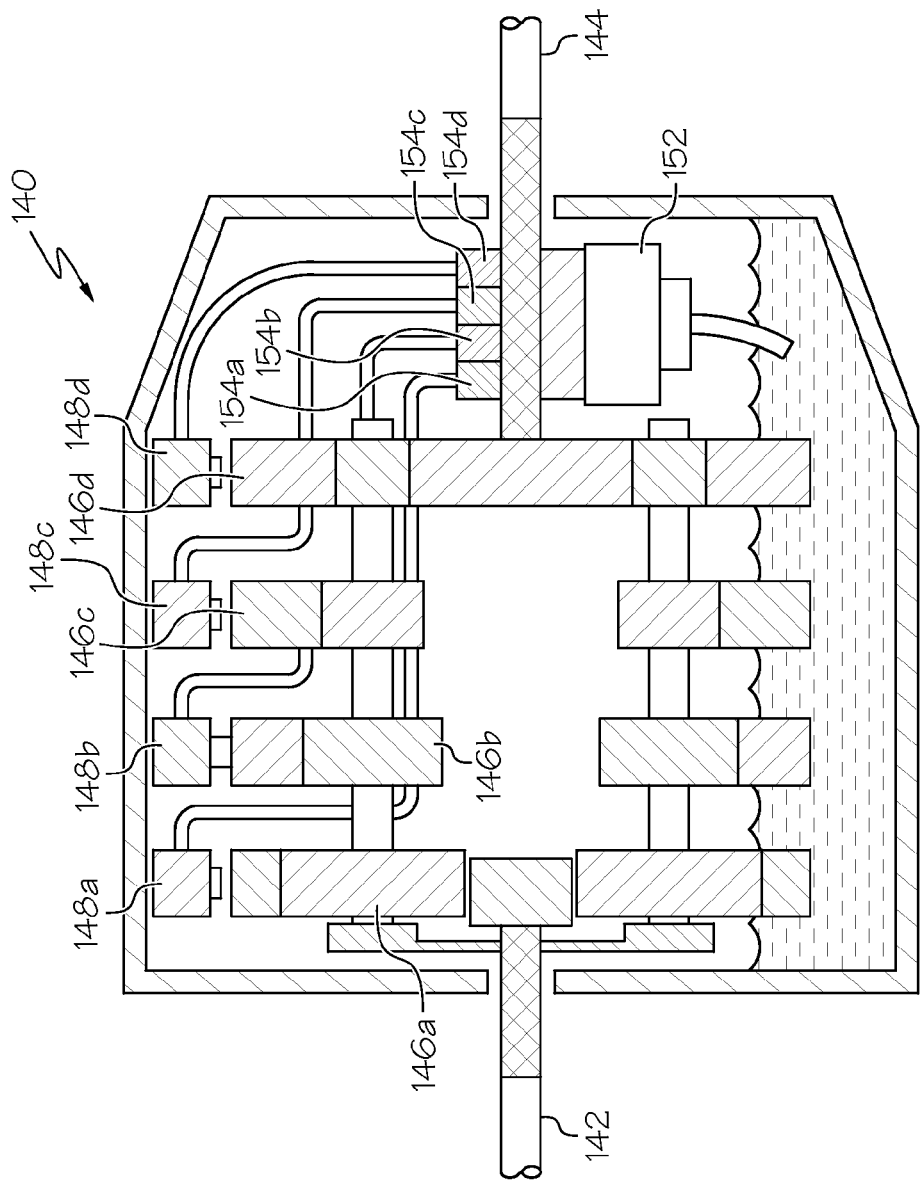
FIG. 2 schematically depicts a multispeed transmission for a hybrid-electric vehicle according to one or more embodiments shown or described herein.

Referring now to FIG. 2, the multispeed transmission 140 is schematically depicted. In this embodiment, the multispeed transmission 140 includes a plurality of gear sets 146a, 146b, 146c, 146d. In the depicted embodiment, each of the gear sets 146a, 146b, 146c, 146d can be selected to couple the input shaft 142 and the output shaft 144 of the multispeed transmission 140 at a designated gear ratio. In the embodiment depicted in FIG. 2, each of the plurality of gear sets 146a, 146b, 146c, 146d are planetary gear sets that are in constant mesh with the input shaft 142 and the output shaft 144, and selection of the designation gear ratio is modified upon actuation of one of a plurality of shift clutches 148a, 148b, 148c, 148d, which selectively couple the respective gear set 146a, 146b, 146c, 146d with the transmission case. The plurality of shift clutches 148a, 148b, 148c, 148d may be sprag clutches that transmit torque in one direction and free-wheel in the other direction, such that torque can be transferred between the plurality of shift clutches 148a, 148b, 148c, 148d with more than one shift clutch 148a, 148b, 148c, 148d at least partially engaged.

The multispeed transmission 140 further includes a valve body 152 that receives pressurized fluid from a pump and directs the pressurized fluid within the multispeed transmission 140. In the embodiment depicted in FIG. 2, the multispeed transmission 140 includes a plurality of shift solenoids 154a, 154b, 154c, 154d that are incorporated into the valve body 152. The shift solenoids 154a, 154b, 154c, 154d are electronically coupled to the electronic control unit 180 and adapted to receive commands from the electronic control unit 180. When an upshift of the multispeed transmission 140 is commanded, for example, shifting engagement from the first gear set 146a to the second gear set 146b, the valve body 152, through the shift solenoids 154a, 154b may redirect pressurized fluid such that engagement of the first shift clutch 148a decreases while the engagement of the second shift clutch 148b increases. The shift solenoids 154a, 154b modulate the application of pressure to the first and second shift clutches 148a, 148b so that a smooth transition, bringing the second gear set 146b into engagement with the input shaft 142 and output shaft 144 of the multispeed transmission 140, can be realized.

Similarly, when a downshift shift sequence of the multispeed transmission 140 is commanded, for example, shifting engagement from the second gear set 146b to the first gear set 146a, the valve body 152, through the shift solenoids 154a, 154b may redirect pressurized fluid such that engagement of the second shift clutch 148b decreases while the engagement of the first shift clutch 148a increases. The shift solenoids 154a, 154b modulate the application of pressure to the first and second shift clutches 148a, 148b so that a smooth transition, bringing the first gear set 146a into engagement with the input shaft 142 and output shaft 144 of the multispeed transmission 140, can be realized.

While specific mention has been made herein to configurations of multispeed transmissions 140, it should be understood that the systems for managing downshifts recited herein may be incorporated into hybrid-electric vehicles 100 having a variety of powertrain configurations.

As is conventionally known, the multispeed transmission 140 allows the internal combustion engine 120 and/or the electric motor 130 to operate within a pre-determined speed range. The electronic control unit 180 may command upshifts and downshifts of the multispeed transmission 140 based on the operating speed of the vehicle, the power output and operating speed of the internal combustion engine 120 and the electric motor 130, and a torque demand from the driver of the hybrid-electric vehicle 100.

In general, the electronic control unit 180 may command operation of the multispeed transmission 140 to complete an upshift or a downshift as quickly as possible, so that the torque application from the internal combustion engine 120 and/or the electric motor 130 to the drive wheels 170 is maximized. Reducing the time of the upshift or downshift may improve drivability as perceived by the driver by improving the responsiveness of the hybrid-electric vehicle 100 to the driver's inputs.

Figure 3:
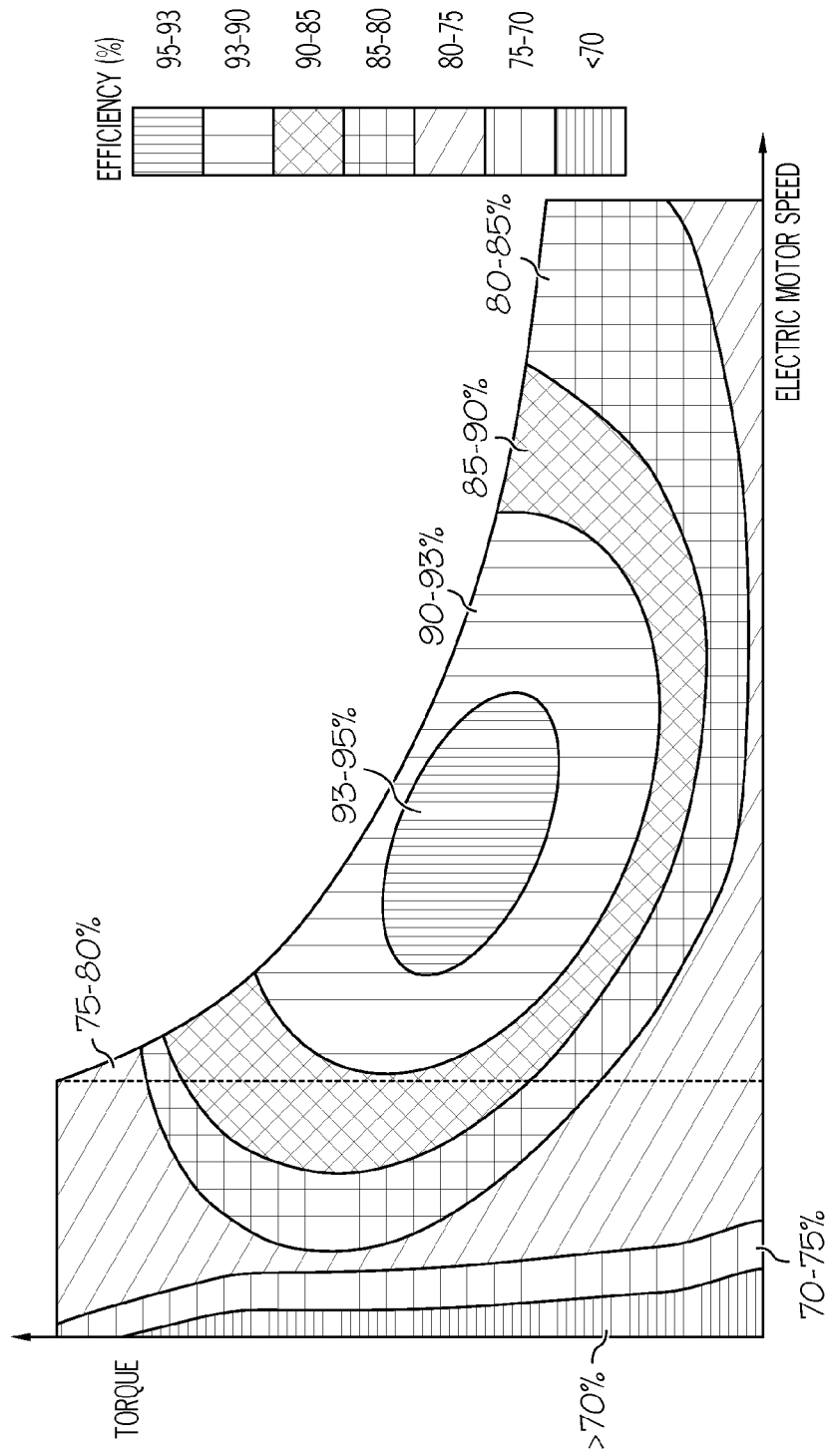
FIG. 3 schematically depicts a hypothetical torque output profile of an electric motor according to one or more embodiments shown or described herein.

However, in some driving conditions, completing an upshift or a downshift as quickly as possible may adversely affect perceived drivability. Such a driving condition may exist, for example, during a "tip-in" acceleration event, in which the driver demands that the electric motor 130 produces increased torque, while the electric motor 130 is operating with limited additional torque output capacity and/or speed output capacity such that the electric motor 130 is unable to produce sufficient torque and/or speed to satisfy the driver's torque demand. Additionally, the electric motor 130 may not have sufficient torque output capacity and/or speed output capacity to complete a downshift and continue lower gear set operation of the multispeed transmission 140 with the desired operating characteristics of the hybrid-electric vehicle 100. An example of the operating envelope of the electric motor 130 is depicted in FIG. 3. At points within the operating envelope of the electric motor 130 in which there is limited additional torque capacity, additional rotational speed reduces the output torque of the electric motor 130. Accordingly, supplemental torque may be required to complete a downshift of the multispeed transmission 140.

In such driving conditions, the electronic control unit 180 may command the internal combustion engine 120 to start and begin producing torque. However, the lag time between when the electronic control unit 180 commands the internal combustion engine 120 to start and when the internal combustion engine 120 produces positive net torque to supply to the multispeed transmission 140 to complete a downshift shift sequence may be significant. This delay may be perceived as poor drivability of the hybrid-electric vehicle 100 by the driver.

Alternatively, the time delay between the electronic control unit 180 commanding a downshift of the multispeed transmission 140 and completion of the downshift shift sequence may be accelerated by directing torque produced by the electric motor 130 away from the drive wheels 170 and towards the multispeed transmission 140. However reducing the motive torque from the drive wheels 170 of the hybrid-electric vehicle 100 may reduce the speed of the hybrid-electric vehicle 100. The deceleration of the hybrid-electric vehicle 100 will be followed with an acceleration of the hybrid-electric vehicle 100 when the multispeed transmission 140 completes the downshift shift sequence and/or when the internal combustion engine 120 produces net positive torque that is delivered to the powertrain.

The lack of torque provided by the electric motor 130 and the internal combustion engine 120 leading to a deceleration or an interrupted acceleration of the hybrid-electric vehicle 100 may be referred to as a "torque hole" within the operating envelope of the hybrid-electric vehicle 100. The torque hole may be perceived as poor drivability of the hybrid-electric vehicle 100 by the driver. Accordingly, minimization of such torque holes within the operating envelope of the hybrid-electric vehicle 100 may be desired.

Figure 4:
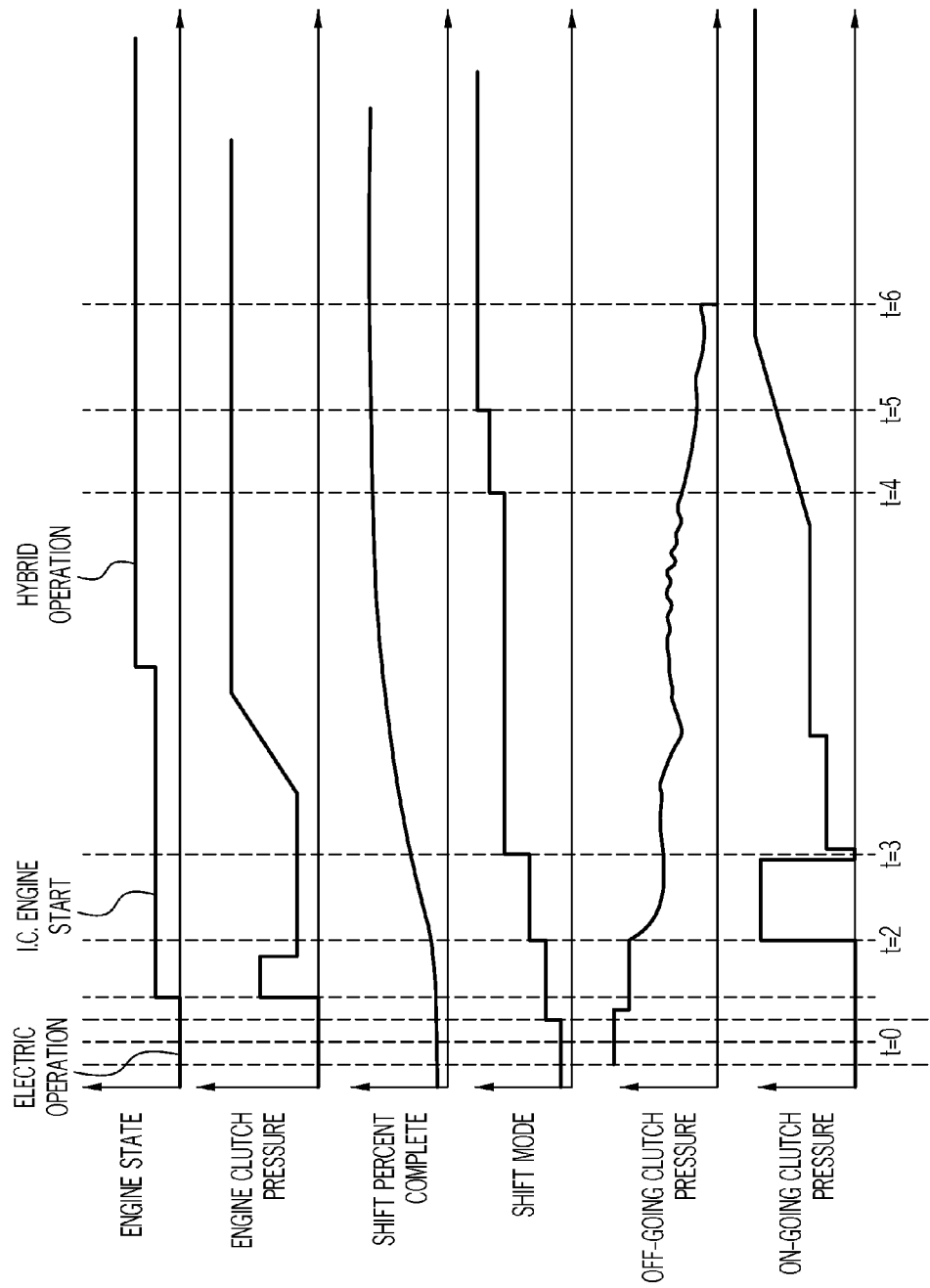
FIG. 4 schematically depicts a downshift shift sequence according to one or more embodiments shown or described herein.
Figure 5:
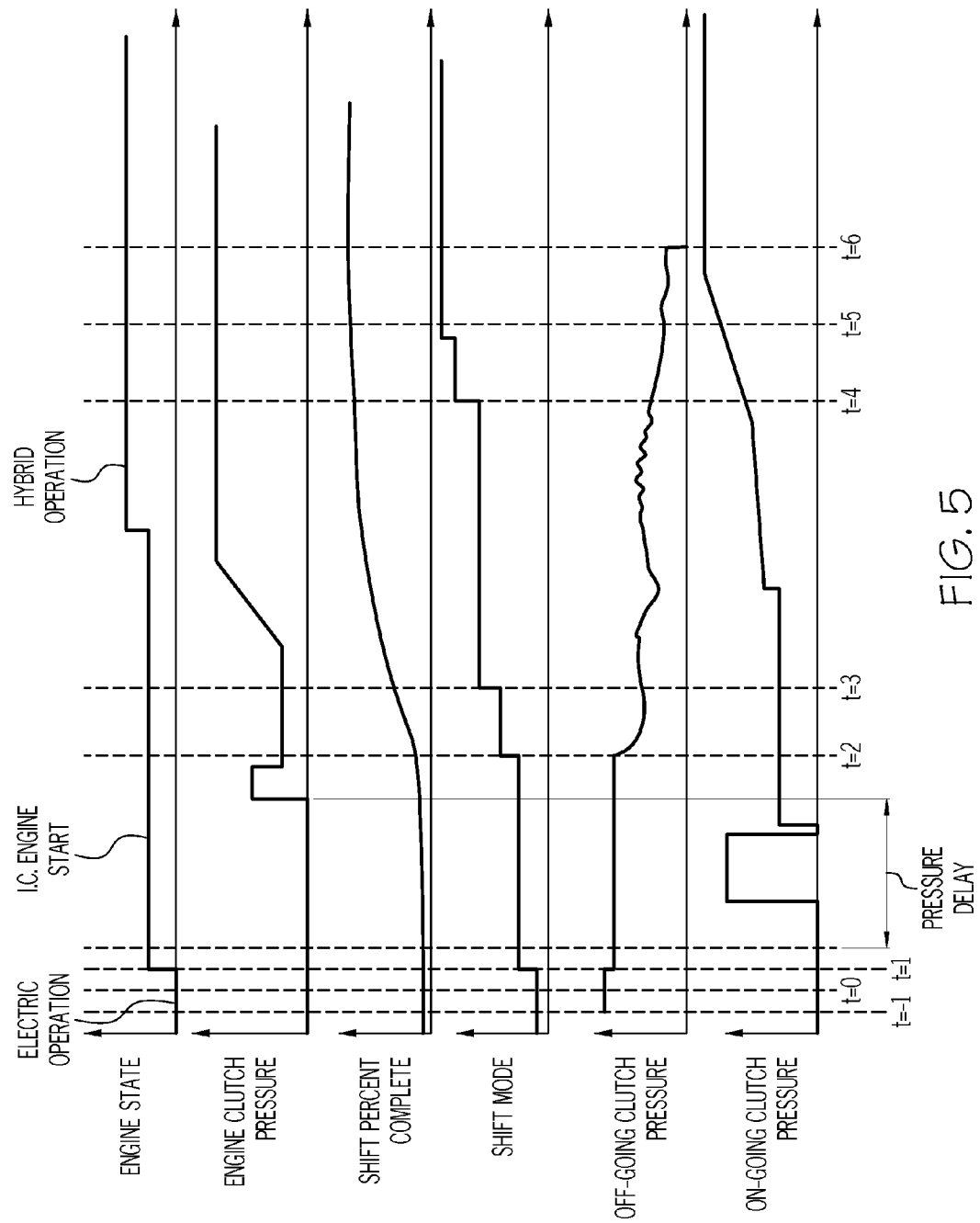
FIG. 5 schematically depicts a downshift shift sequence according to one or more embodiments shown or described herein.

Referring now to FIGS. 4 and 5, shift sequences of the hybrid-electric vehicle 100 according to the present disclosure are depicted. Referring to FIG. 4, a conventional downshift shift sequence in which the electric motor 130 has sufficient additional torque output capacity to support an immediate downshift of the multispeed transmission 140 is depicted. In this embodiment, the driver of the hybrid-electric vehicle 100 demands increased torque delivery to the drive wheels 170 at time t=−1. At time t=0, the electronic control unit 180 determines that a downshift of the multispeed transmission 140 is required. At time t=1, pre-shift of the multispeed transmission 140 is initiated. The valve body 152 of the multispeed transmission 140 decreases pressure delivery to the off-going shift clutch (here, the second shift clutch 148b) such that the off-going shift clutch is pressurized to maintain full engagement of the off-going gear set (here, the second gear set 146b). The electronic control unit 180 also commands the internal combustion engine 120 to start. The engine clutch 124 is pressurized so that the internal combustion engine 120 is at least partially engaged with the input shaft 132 of the multispeed transmission 140. In this embodiment, the electric motor 130 may deliver torque to the internal combustion engine 120 to assist with start-up of the internal combustion engine 120.

At time t=2, the downshift shift sequence is started. The valve body 152 of the multispeed transmission 140 is commanded to begin tapering pressure delivered to the off-going shift clutch 148b until the pressure is reduced to a pre-determined off-going pressure limit. The valve body 152 of the multispeed transmission 140 is also commanded to stroke the pressure that is directed to oncoming shift clutch. After pressure on the off-going shift clutch 148b reaches the pre-determined off-going pressure limit, at time t=3, the ratio change sequence is commenced. With the ratio change sequence commenced, pressure to the on-coming shift clutch 148a is maintained at an elevated value such that the on-coming gear set 146a is partially engaged with the input shaft 132 of the multispeed transmission 140. At a time after time t=3, pressure to the off-going shift clutch 148b is reduced by the valve body 152. As the pressure to the off-going shift clutch 148b is reduced, pressure to the on-coming shift clutch 148a is increased, at a time after t=3 that is designated as the synchronization point. Pressure introduced to the on-coming shift clutch 148a is rapidly increased while pressure to the off-going shift clutch 148b continues to be drawn down.

At the synchronization point, balance of torque delivered to the output shaft 122 of the multispeed transmission 140 is transitioned between the on-coming gear set 146a and the off-coming gear set. During the ratio change sequence, the pressures maintained on the off-going shift clutch 148b and the on-coming shift clutch 148a maintain partial engagement of both the off-going gear set 146b and the on-coming gear set 146a, respectively. At times before the synchronization point, the pressures applied to the off-going shift clutch 148b and the on-coming shift clutch 148a balance torque directed through the off-going gear set 146b and the on-coming gear set 146a such that a majority of the torque directed through the multispeed transmission 140 is directed through the off-going gear set 146b. At the synchronization point, the torque directed through the off-going gear set 146b and the on-coming gear set 146a is approximately equal. At times after the synchronization point, a majority of torque directed through the multispeed transmission 140 is directed through the on-coming gear set 146a.

After the synchronization point, the valve body 152 of the multispeed transmission 140 continues to increase pressure on the on-coming shift clutch 148a and reduce pressure in the off-going shift clutch 148b. The valve body 152 may rapidly modulate the pressure in the off-going shift clutch 148b so that torque delivery to the on-coming gear set 146a occurs smoothly during the shift event. As the pressure applied to the on-coming shift clutch 148a reaches a level at which the speed of the output shaft 122 of the multispeed transmission 140 is controlled by the on-coming gear set 146a of the multi-speed transmission, the ratio change may be considered to be finished at time t=4. After time t=4, the valve body 152 of the multispeed transmission 140 continues to decrease pressure delivered to the off-going shift clutch 148b and continues to increase pressure delivered to the on-going clutch. At time t=6, the pressure delivered to the on-coming shift clutch 148a is within about 95% of the maximum pressure delivered to the on-coming shift clutch 148a during steady-state operation, and the shift event may be considered finished. After time t=6, any remaining pressure that is delivered to the off-going shift clutch 148b is continued to be drawn down.

Another shift sequence for a downshift for a hybrid-electric vehicle 100 is depicted in FIG. 5. In contrast to the downshift shift sequence depicted in FIG. 4 and described hereinabove, the downshift shift sequence depicted in FIG. 5 includes a pressure control delay during the shift event. Such a downshift shift sequence may be selectively implemented at conditions within the operating envelope in which the electric motor 130 does not have sufficient additional torque output capacity to complete the downshift shift sequence while maintaining operating characteristics of the hybrid-electric vehicle 100. By introducing the pressure control delay in the shift event, the time to complete the downshift shift sequence will be increased as compared to a downshift shift sequence that does not include a pressure control delay, as depicted in FIG. 4. However, a shift event that includes a pressure control delay may provide the internal combustion engine 120 time to start and begin producing net positive torque for delivery to the multispeed transmission 140, thereby minimizing any effects of the torque hole on vehicle driveability.

Referring in detail to FIG. 5, the driver of the hybrid-electric vehicle 100 demands increased torque delivery to the drive wheels 170 at time t=−1. At time t=0, the electronic control unit 180 determines that a downshift of the multispeed transmission 140 is required. At time t=1, pre-shift of the multispeed transmission 140 is initiated. The valve body 152 of the multispeed transmission 140 decreases pressure delivery to the off-going shift clutch (here, the second shift clutch 148b) such that the off-going shift clutch is pressurized to maintain full engagement of the off-going gear set (here, the second gear set 146b). The electronic control unit 180 also commands the internal combustion engine 120 to start. The engine clutch 124 is pressurized so that the internal combustion engine 120 is at least partially engaged with the input shaft 132 of the multispeed transmission 140. In this embodiment, the electric motor 130 may deliver torque to the internal combustion engine 120 to assist with start-up.

The multispeed transmission 140 is held in this pre-staged shift configuration until the internal combustion engine 120 has time to start and begin delivering net positive torque to the multispeed transmission 140. Comparing the depicted shift sequence of FIG. 5 with a conventional shift sequence of FIG. 4, the duration between t=1 and t=2 in which the multispeed transmission 140 is held in the pre-stage shift configuration is longer in the shift sequence depicted in FIG. 5. The increase in duration that the multispeed transmission 140 is held in the pre-stage shift configuration, however, allows the powertrain to minimize the effects of the torque hole, which the driver may perceive as being adverse to driveability.

Time t=2, the time at which the downshift shift sequence is started in the multispeed transmission 140, occurs at time delayed from time t=1 as compared with a conventional downshift as depicted in FIG. 4. However, at time t=2 of the shift sequence depicted in FIG. 5, the internal combustion engine 120 produces net positive torque, thereby delivering torque to the multispeed transmission 140 to complete the downshift shift sequence. In some embodiments, the internal combustion engine 120 will continue to increase the delivery of torque to the multispeed transmission 140, thereby reducing the torque output requirement of the electric motor 130. Alternatively, the electric motor 130 may continue to operate at full torque output to complete the downshift shift sequence quickly and provide torque to the drive wheels 170 to satisfy the driver's torque demand.

At time t=2 the valve body 152 of the multispeed transmission 140 is commanded to begin tapering pressure delivered to the off-going shift clutch 148b until the pressure is reduced to a pre-determined off-going pressure limit. The valve body 152 of the multispeed transmission 140 is also commanded to stroke the pressure that is directed to oncoming shift clutch. After pressure on the off-going shift clutch 148b reaches the pre-determined off-going pressure limit, at time t=3, the ratio change sequence is commenced. With the ratio change sequence commenced, pressure to the on-coming shift clutch is maintained at an elevated value such that the on-coming gear set 146a is partially engaged with the input shaft 132 of the multispeed transmission 140. At a time after time t=3, pressure to the off-going shift clutch 148b is reduced by the valve body 152. As the pressure to the off-going shift clutch 148b is reduced, pressure to the on-coming shift clutch 148a is increased, at a time after t=3 that is designated as the synchronization point. Pressure introduced to the on-coming shift clutch 148a is rapidly increased while pressure to the off-going shift clutch 148b continues to be drawn down.

At the synchronization point, balance of torque delivered to the output shaft 122 of the multispeed transmission 140 is transitioned between the on-coming gear set 146a and the off-coming gear set. During the ratio change sequence, the pressures maintained on the off-going shift clutch 148b and the on-coming shift clutch 148a maintain partial engagement of both the off-going gear set 146b and the on-coming gear set 146a, respectively. At times before the synchronization point, the pressures applied to the off-going shift clutch 148b and the on-coming shift clutch 148a balance torque directed through the off-going gear set 146b and the on-coming gear set 146a such that a majority of the torque directed through the multispeed transmission 140 is directed through the off-going gear set 146b. At the synchronization point, the torque directed through the off-going gear set 146b and the on-coming gear set 146a is approximately equal. At times after the synchronization point, a majority of torque directed through the multispeed transmission 140 is directed through the on-coming gear set 146a.

After the synchronization point, the valve body 152 of the multispeed transmission 140 continues to increase pressure on the on-coming shift clutch 148a and reduce pressure in the off-going shift clutch 148b. The valve body 152 may rapidly modulate the pressure in the off-going shift clutch 148b so that torque delivery to the on-coming gear set 146a occurs smoothly during the shift event. As the pressure applied to the on-coming shift clutch 148a reaches a level at which the speed of the output shaft 122 of the multispeed transmission 140 is controlled by the on-coming gear set 146a of the multi-speed transmission, the ratio change may be considered to be finished at time t=4. After time t=4, the valve body 152 of the multispeed transmission 140 continues to decrease pressure delivered to the off-going shift clutch 148b and continues to increase pressure delivered to the on-going clutch. At time t=6, the pressure delivered to the on-coming shift clutch 148a is within about 95% of the maximum pressure delivered to the on-coming shift clutch 148a during steady-state operation, and the shift event may be considered finished. After time t=6, any remaining pressure that is delivered to the off-going shift clutch 148b is continued to be drawn down. In downshift shift sequences that incorporate pressure control delay as described herein, the duration of time between time t=2 and time t=5 may be reduced as compared to the duration between time t=2 and time t=5 for conventional downshifts where the electric motor does not have sufficient additional torque capacity to complete the downshift. Because of the lack of additional torque capacity at these operating conditions, the downshift shift sequence is held until the internal combustion engine can produce sufficient torque to complete the downshift shift sequence.

As depicted in FIGS. 4 and 5, the pressure control delay of the instant application may delay the completion of the downshift shift sequence for operating conditions at which the electric motor 130 does not have sufficient additional torque output capacity to complete the downshift shift sequence while simultaneously starting and bringing the internal combustion engine 120 online to produce motive torque. However, pre-staging the downshift shift sequence by modulating the pressures delivered to the off-going shift clutch 148b and the on-coming shift clutch 148a prepares the multispeed transmission 140 to complete the shift sequence quickly upon the internal combustion engine 120 being able to provide net positive torque to the multispeed transmission 140.

In contrast, downshift shift sequences that occur at positions within the operating envelope where the electric motor 130 does not have sufficient additional torque output capacity to complete the downshift and the hybrid-electric vehicle 100 does not have the pressure control delay incorporated into the electronic control unit 180 may instead delay initiation of the downshift shift sequence, start the internal combustion engine 120 and delay the shift sequence until the internal combustion engine 120 has time to provide net positive torque to the multispeed transmission 140. In these embodiments, the time to complete the downshift shift sequence, evaluated beginning when at the driver's increased torque demand and ending at time t=6, will be longer for hybrid-electric vehicles that do not include the pressure control delay as compared to hybrid-electric vehicles that include the pressure control delay, as described herein.

Figure 6:
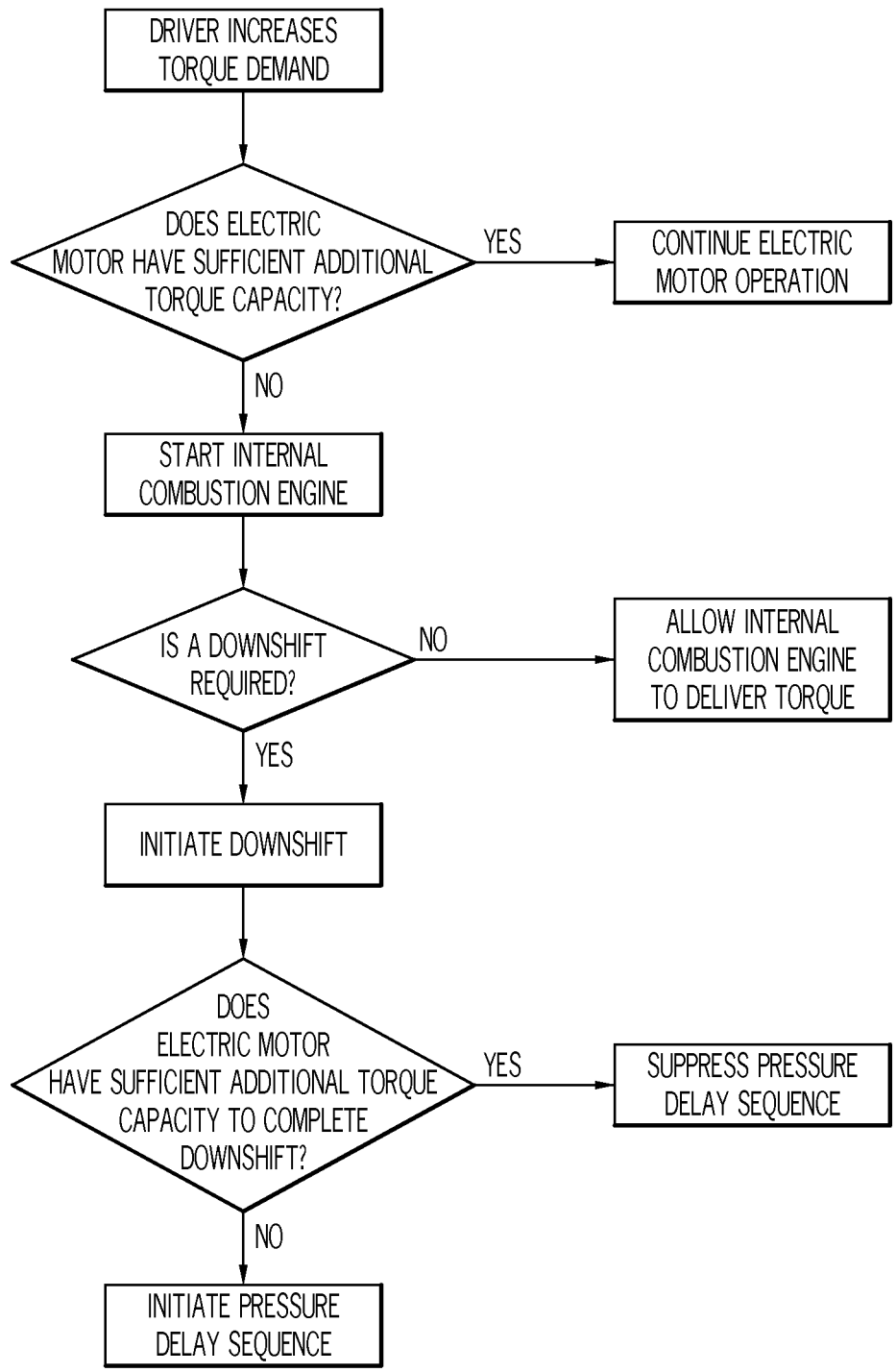
FIG. 6 schematically depicts logic for controlling a downshift shift sequence according to one or more embodiments shown or described herein.

Determination of whether to implement the pressure control delay into the downshift shift sequence is programmed into the electronic control unit 180, and may be incorporated into computer readable instructions that are executed by the electronic control unit 180 to control powertrain operation. A block diagram depicting logic that is incorporated into the computer readable instruction set that is evaluated when the driver demands additional torque is depicted in FIG. 6. Referring to FIG. 6 in detail, the control logic of the hybrid-electric vehicle 100 may initiate an evaluation routine when the driver demands additional torque while the vehicle is in motion in a driver tip-in event. The electronic control unit 180 determines that the driver demands additional torque from an accelerator pedal position sensor 106. The electronic control unit 180 may set a driver demand torque variable, which reflects the torque that is required to be produced by the powertrain to satisfy the driver's demand. The driver demand torque variable may be calculated based on various combinations of the current operating torque of the electric motor 130, the change in position of the accelerator pedal 104, and/or the opening speed of the accelerator pedal 104, when actuated by the driver. By evaluating the driver's input to the hybrid-electric vehicle 100 to produce additional power, the electronic control unit 180 may estimate the driver's torque demand to accelerate the hybrid-electric vehicle 100.

The electronic control unit 180 may determine that the driver's torque demand exceeds the additional torque output capacity of the electric motor 130. If the electric motor 130 has sufficient additional torque capacity to satisfy the calculated torque demand, the electronic control unit 180 may command the electric motor 130 to provide additional torque. If the electronic control unit 180 determines that the electric motor 130 does not have sufficient additional torque output capacity to satisfy the calculated torque demand, the electronic control unit 180 may command the internal combustion engine 120 to start.

In some embodiments, the electronic control unit 180 may be programmed with a decision matrix that is based on an operating envelope map that corresponds to the operating envelope of the hybrid-electric vehicle 100 and/or the electric motor 130. In these embodiments, the decision of whether to implement the pressure control delay into a particular downshift shift sequence may evaluate electric motor 130 operating conditions, for example, operating speed and torque output. The electronic control unit 180 may also calculate a driver's torque demand variable by evaluating the accelerator pedal 104 position and/or the accelerator pedal 104 opening speed with the pedal sensor 106. The calculation of the driver's torque demand variable may be interpreted by the electronic control unit 180 to estimate how much additional torque output is required by the driver, and whether the additional torque output is likely to be a sustained demand by the driver. The electronic control unit 180 may then evaluate the operating envelope of the electric motor 130 to determine if the electric motor 130 has sufficient additional torque output capacity to satisfy the driver's torque demand.

The electronic control unit 180 may also command the multispeed transmission 140 to execute a downshift shift sequence so that the electric motor 130 and/or the internal combustion engine 120 can operate at operating conditions at which additional torque is available to be supplied to the drive wheels 170. In general, completion of a downshift shift sequence requires additional torque to be supplied to a turbine of the multispeed transmission 140. Internal losses in the multispeed transmission 140 may be greater during upshift and downshift shift sequences than during steady state operation of the multispeed transmission 140. Accordingly, additional torque from the electric motor 130 may be directed to the multispeed transmission 140 to complete the shift sequence. At operating conditions where the electric motor 130 does not have sufficient additional torque capacity, torque that would otherwise be delivered to the drive wheels 170 to accelerate or maintain speed of the hybrid-electric vehicle 100 is instead directed to the multispeed transmission 140. This redirection of torque from the drive wheels 170 to the multispeed transmission 140 results in a decrease in hybrid-electric vehicle 100 operating speed and forms the torque hole that may be perceived by the driver as adversely affecting drivability of the hybrid-electric vehicle 100.

If the electronic control unit 180 determines that the electric motor 130 does not have sufficient additional torque capacity to complete a downshift shift sequence of the multispeed transmission 140, the electronic control unit 180 may initiate the pressure delay control sequence according to the instant disclosure. The electronic control unit 180 may initiate a downshift shift sequence by commanding the valve body 152 to increase pressure delivered to the on-coming shift clutch 148a corresponding the on-coming gear set 146a and decrease pressure delivered to the off-going shift clutch 148b corresponding to the off-going gear set 146b. The electronic control unit 180 may maintain the balance of pressures delivered to the on-coming and off-going shift clutches 148a, 148b, 148c, 148d until a pre-determined time has passed from initiation of the internal combustion engine 120 or until the internal combustion engine 120 produces a pre-determined amount of torque, which may be estimated by the electronic control unit 180 based on the operating speed of the internal combustion engine 120, the amount of fuel delivered to the internal combustion engine 120, mass airflow into the internal combustion engine 120 and/or measurement of direction and magnitude of torque applied through the engine clutch 124.

In various embodiments, the electronic control unit 180 may terminate the pressure delay control sequence, thereby continuing with the downshift shift sequence, at various pre-determined times and/or various pre-determined output torques of the internal combustion engine 120. In one embodiment, the electronic control unit 180 may terminate the pressure delay control sequence once the internal combustion engine 120 produces a net-positive torque for delivery to the multispeed transmission 140. In another embodiment, the electronic control unit 180 may terminate the pressure delay control sequence once the internal combustion engine 120 produces sufficient torque to eliminate any torque hole in the operating envelope of the hybrid-electric vehicle 100. In yet another embodiment, the electronic control unit 180 may terminate the pressure delay control sequence when the internal combustion engine 120 produces sufficient torque that the torque hole caused by continuing the downshift shift sequence is minimally perceptible to the driver of the hybrid-electric vehicle 100.

It should now be understood that systems for managing downshifts for hybrid-electric vehicles according to the present disclosure include an electronic control unit that is programmed to evaluate a torque demand by a driver, determine if a downshift of the multispeed transmission is required, and determine if the electric motor has sufficient additional torque capacity to complete the downshift shift sequence. If the electronic control unit determines that the electric motor does not have sufficient additional torque capacity to complete the downshift shift sequence, the electronic control unit initiates a pressure delay sequence that interrupts the downshift shift sequence, providing the internal combustion engine of the hybrid-electric vehicle time to start and come up to operating conditions to provide torque to supplement the electric motor. By pre-staging and interrupting the downshift shift sequence with the pressure delay sequence, total time to complete the downshift shift sequence can be minimized while minimizing the driver's adverse perception of drivability of the hybrid-electric vehicle.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for managing downshifts in a hybrid-electric vehicle, comprising:
   a multispeed transmission having an input shaft, a first gear set, a first shift clutch that selectively couples the first gear set with the input shaft, a second gear set, a second shift clutch that selectively couples the second gear set to the input shaft, and a valve body that controls a hydraulic pressure applied to the first shift clutch and the second shift clutch to selectively engage the first shift clutch and the second shift clutch;
   an internal combustion engine selectively coupled to the input shaft of the multispeed transmission;
   an electric motor coupled to the input shaft of the multispeed transmission; and
   an electronic control unit programmed to:
      evaluate a torque demand;
      start the internal combustion engine;
      pre-stage a downshift shift sequence by modifying the hydraulic pressure through the valve body to partially disengage the second shift clutch and partially engage the first shift clutch;
      interrupt the downshift shift sequence until a pre-determined torque supplemental event occurs; and
      complete the downshift shift sequence by modifying the hydraulic pressure through the valve body to completely disengage the second gear set from the input shaft with the second shift clutch and completely engage the first gear set and the input shaft with the first shift clutch.

2. The system of claim 1, wherein the electronic control unit further calculates a driver demand torque variable based on the torque demand, and the electronic control unit begins to complete the downshift shift sequence after the electric motor and the internal combustion engine produce an amount of torque that equals the driver demand torque variable.

3. The system of claim 1, wherein the electronic control unit is further programmed to command coupling of the internal combustion engine to the input shaft after the internal combustion engine produces a net positive torque.

4. The system of claim 1, wherein the pre-determined torque supplemental event occurs when the internal combustion engine produces a pre-determined amount of torque.

5. The system of claim 4, wherein the downshift shift sequence is interrupted until the internal combustion engine and the electric motor produce sufficient torque to complete the downshift shift sequence without decreasing vehicle speed.

6. The system of claim 1, wherein the pre-determined torque supplemental event occurs after a pre-determined time has elapsed from the internal combustion engine being started.

7. The system of claim 1, further comprising a transmission controller having a computer processor and a memory storing a computer readable instruction set that controls hydraulic pressure within the valve body when the computer readable instruction set is executed by the computer processor.

8. The system of claim 1, wherein the torque demand is determined based on a position of an accelerator pedal.

9. The system of claim 8, wherein the electronic control unit further calculates the torque demand based on an opening speed of the accelerator pedal.

10. The system of claim 1, wherein the electronic control unit further determines whether the electric motor has sufficient additional torque capacity to complete the downshift shift sequence from the second gear set to the first gear set.

11. The system of claim 10, wherein determining whether the electric motor has sufficient additional torque capacity to complete the downshift shift sequence is evaluated by evaluating vehicle speed, electric motor torque production, and additional torque output capacity of the electric motor.

12. A system for managing downshifts in a hybrid-electric vehicle, comprising:
   a multispeed transmission having an input shaft, a first gear set, a first shift clutch that selectively couples the first gear set with the input shaft, a second gear set, a second shift clutch that selectively couples the second gear set to the input shaft, and a valve body that controls a hydraulic pressure applied to the first shift clutch and the second shift clutch to selectively engage the first shift clutch and the second shift clutch;
   an internal combustion engine selectively coupled to the input shaft of the multispeed transmission;
   an electric motor coupled to the input shaft of the multispeed transmission; and
   an electronic control unit programmed to:
      initiate a downshift shift sequence of the multispeed transmission;
      initiate a pressure delay in the downshift shift sequence by interrupting the downshift shift sequence and maintaining pressure to partially disengage the second shift clutch and partially engage the first shift clutch;
      maintain the pressure delay until a pre-determined torque supplemental event occurs; and
      complete the downshift shift sequence by completely disengaging the second gear set from the input shaft with the second shift clutch and completely engaging the first gear set and the input shaft with the first shift clutch.

13. The system of claim 12, wherein the electronic control unit is further programmed to command coupling of the internal combustion engine to the input shaft after the internal combustion engine produces a net positive torque.

14. The system of claim 12, wherein the pre-determined torque supplemental event occurs when the internal combustion engine produces a pre-determined amount of torque.

15. The system of claim 14, wherein the downshift shift sequence is interrupted until the internal combustion engine and the electric motor produce torque to complete the downshift shift sequence without decreasing vehicle speed.

16. The system of claim 12, wherein the pre-determined torque supplemental event occurs after a pre-determined time has elapsed from the internal combustion engine being started.

17. The system of claim 12, further comprising a transmission controller comprising a computer processor and a memory storing a computer readable instruction set that, when executed by the computer processor, controls hydraulic pressure within the valve body.

18. The system of claim 12, wherein the electronic control unit is further programmed to:
   evaluate a torque demand;
   determine whether the electric motor has sufficient additional torque capacity to satisfy the torque demand; and
   start the internal combustion engine.

19. The system of claim 18, wherein the electronic control unit is further programmed to determine whether the electric motor has sufficient additional torque capacity to complete the downshift shift sequence from the second gear set to the first gear set.

20. The system of claim 19, wherein determining whether the electric motor has sufficient additional torque capacity to complete the downshift shift sequence are evaluated by evaluating vehicle speed, electric motor torque production, and additional torque output capacity of the electric motor.

* * * * *

UNITED STATES PATENT AND TRADEMARK OFFICE
CERTIFICATE OF CORRECTION

PATENT NO. : 9,238,460 B1  
APPLICATION NO. : 14/338687  
DATED : January 19, 2016  
INVENTOR(S) : Hong Jiang et al.

Page 1 of 1

It is certified that error appears in the above-identified patent and that said Letters Patent is hereby corrected as shown below:

ON THE TITLE PAGE

Item (71) Applicants, after "Toyota Motor Corporation, Toyota" insert --City--, therefor.

Signed and Sealed this  
Third Day of May, 2016

Michelle K. Lee  
*Director of the United States Patent and Trademark Office*